US010145049B2

(12) United States Patent
Nakamoto (10) Patent No.: US 10,145,049 B2
(45) Date of Patent: Dec. 4, 2018

(54) DRUM WASHING MACHINE (71) Applicants: HAIER ASIA CO., LTD., Tokyo (JP); QINGDAO HAIER WASHING MACHINE CO., LTD., Shandong (CN)

(72) Inventor: Shigeharu Nakamoto, Tokyo (JP)

(73) Assignees: Haier Asia Co., Ltd., Tokyo (JP); Qingdao Haier Washing Machine Co., Ltd., Shandong (CN)

(*) Notice: Subject to any disclaimer, the term of this patent is extended or adjusted under 35 U.S.C. 154(b) by 144 days.

(21) Appl. No.: 15/501,308

(22) PCT Filed: Aug. 5, 2015

(86) PCT No.: PCT/CN2015/086174
§ 371 (c)(1),
(2) Date: Feb. 2, 2017

(87) PCT Pub. No.: WO2016/019876
PCT Pub. Date: Feb. 11, 2016

(65) Prior Publication Data
US 2017/0218559 A1 Aug. 3, 2017

(30) Foreign Application Priority Data
Aug. 5, 2014 (JP) .................. 2014-159929

(51) Int. Cl.
*D06F 23/02* (2006.01)
*D06F 23/06* (2006.01)
(Continued)

(52) U.S. Cl.
CPC .............. *D06F 37/40* (2013.01); *D06F 23/02* (2013.01); *D06F 23/06* (2013.01); *D06F 33/02* (2013.01);
(Continued)

(58) Field of Classification Search
CPC .......... D06F 23/02; D06F 23/06; D06F 33/02; D06F 37/04; D06F 37/065; D06F 37/304;
(Continued)

(56) References Cited

U.S. PATENT DOCUMENTS

2013/0111676 A1* 5/2013 Jun ........................ H02K 21/12
8/137

FOREIGN PATENT DOCUMENTS

| CN | 2576758 Y | 10/2003 |
| CN | 1453416 A | 11/2003 |

(Continued)

OTHER PUBLICATIONS

International Search Report dated Nov. 11, 2015 from International Patent Application No. PCT/CN2015/086185, filed Aug. 5, 2015.
(Continued)

*Primary Examiner* — Levon J Shahinian
(74) *Attorney, Agent, or Firm* — Sunstone IP (57) ABSTRACT

A drum washing machine capable of driving a drum and a rotating body to rotate by a driving part, is provided. The driving part includes: a driving motor; a first rotating shaft fixed to the drum; a second rotating shaft fixed to the rotating body; a first pulley, which is fixed on the first rotating shaft and connected with the driving motor via a first transmission belt; a second pulley, which is connected with the driving motor via a second transmission belt and has an outer diameter different from that of the first pulley; and a clutch mechanism part, configured to switch a driving form of the driving part between a biaxial driving form and a drum independent driving form.

9 Claims, 6 Drawing Sheets

(51) Int. Cl.
*D06F 33/02* (2006.01)
*D06F 37/04* (2006.01)
*D06F 37/06* (2006.01)
*D06F 37/30* (2006.01)
*D06F 37/40* (2006.01)
*D06F 39/00* (2006.01)
*D06F 39/02* (2006.01)
*D06F 39/08* (2006.01)
*F16D 11/14* (2006.01)

(52) U.S. Cl.
CPC ............ *D06F 37/04* (2013.01); *D06F 37/065* (2013.01); *D06F 37/304* (2013.01); *D06F 39/005* (2013.01); *D06F 39/02* (2013.01); *D06F 39/083* (2013.01); *D06F 39/087* (2013.01); *D06F 39/088* (2013.01); *F16D 11/14* (2013.01)

(58) Field of Classification Search
CPC ........ D06F 37/40; D06F 39/005; D06F 39/02; D06F 39/083; D06F 39/087; D06F 39/088; F16D 11/14
USPC ...................................... 68/24, 58, 131, 140
See application file for complete search history.

(56) References Cited

FOREIGN PATENT DOCUMENTS

| | | | |
|---|---|---|---|
| CN | 1888197 | A | 1/2007 |
| CN | 1888202 | A | 1/2007 |
| CN | 104032542 | A | 9/2014 |
| CN | 203890713 | U | 10/2014 |
| CN | 203890716 | U | 10/2014 |
| EP | 1439255 | A1 | 7/2004 |
| EP | 2025791 | A1 | 2/2009 |
| JP | 55-005807 | U | 6/1953 |
| JP | 55-039047 | U | 9/1953 |
| JP | 55-060884 | U | 10/1953 |
| JP | S59-156388 | A | 9/1984 |
| JP | 3280992 | A | 12/1991 |
| JP | 2001-162087 | A | 6/2001 |
| JP | 2011-101726 | A | 5/2011 |
| KR | 950007852 | B1 | 7/1995 |
| KR | 100186017 | | 5/1999 |
| KR | 20050087342 | A | 8/2005 |

OTHER PUBLICATIONS

International Search Report dated Nov. 12, 2015 from International Patent Application No. PCT/CN2015/086174, filed Aug. 5, 2015.
International Search Report dated Nov. 17, 2015 from International Patent Application No. PCT/CN2015/086187, filed Aug. 5, 2015.
Search Report dated Mar. 15, 2018 from European Patent Application No. 15829894.
Office Action dated Apr. 16, 2018 from Japanese Patent Application No. 2014-159929.
Office Action dated Nov. 30, 2017 from Korean Patent Application No. 10-2017-7005785.

* cited by examiner

DRUM WASHING MACHINE

CROSS REFERENCE TO RELATED APPLICATION(S)

This application is a U.S. National Stage Entry of International Patent Application No. PCT/CN2015/086174, filed Aug. 5, 2015, which claims the benefit of Japanese Patent Application No. 2014-159929, filed Aug. 5, 2014, the disclosures of which are hereby incorporated entirely herein by reference.

TECHNICAL FIELD

The present disclosure relates to a drum washing machine, which not only can carry out an operation from washing to drying continuously, but also can carry out washing without carrying out drying.

BACKGROUND

In the past, a drum washing machine enables a drum of horizontal axis type to rotate in an outer tank the bottom of which is stored with water, washings are lifted up and dropped down by baffles arranged in the drum, and the washings are thrown to an inner circumferential surface of the drum to realize washing.

In this way, in a structure of stirring the washings by the baffles, the washings are difficult to twine or rub against each other. Therefore, compared with an automatic washing machine in which the washings are washed by rotating a pulsator in a washing and spinning tank, a mechanical force acted on the washings by the drum washing machine tends to be smaller, and the detergency tends to be degraded.

Therefore, as for a drum washing machine, a following structure may be adopted so as to improve the detergency, in the structure, a rotating body having a protruding part on the surface thereof is arranged at an end part of the drum, and the drum and the rotating body are enabled to rotate at different rotation speeds during washing and rinsing. During spinning by the drum washing machine, the drum and the rotating body rotate in a manner of spinning the washings properly, i.e., rotate at a same rotating speed.

For example, a driving part for rotating the drum and the rotating body may adopt the following structure: the driving part is provided with a driving motor for the drum and a driving motor for the rotating body, the rotation of the driving motor for the drum is transferred to a rotating shaft of the drum by transmission belts and pulleys so as to enable the drum to rotate, and the rotation of the driving motor for the rotating body is transferred to a rotating shaft of the rotating body by transmission belts and pulleys so as to enable the rotating body to rotate (with reference to a patent literature 1).

PRIOR TECHNICAL LITERATURE

Patent Literature

Patent Literature 1: Japanese Laid-Open Patent Publication No. 03-280992

SUMMARY

Problems to be Solved by the Disclosure

In the case that the above structure is adopted in the driving part, the rotating speed of the drum and the rotating body may be different by a simple structure formed with a retarding mechanism including transmission belts and pulleys. Therefore, compared with the situation that a retarding mechanism consisted of gears is adopted, the reliability in terms of fault and the like is high. However, since two driving motors are required for enabling the drum and the rotating body to rotate, it is difficult to configure the driving part at low cost.

In view of the above problems, the present disclosure completes a technical solution of providing a drum washing machine capable of rotating the drum and the rotating body by a driving part with low cost and high reliability.

Solution for Solving the Problems

The drum washing machine involved in a main manner of the present disclosure includes: an outer tank provided in a housing; a drum, which is provided in the outer tank and capable of rotating about a horizontal axis or an inclination axis inclining with respect to a horizontal direction; a rotating body, which is provided at a rear part of the drum and a surface of which is provided with a protruding part contacting washings; and a driving part, configured to drive the drum and the rotating body to rotate. The driving part includes: a driving motor; a first rotating shaft fixed to the drum; a second rotating shaft fixed to the rotating body; a first pulley, which is fixed on the first rotating shaft and is connected with the driving motor via a first transmission belt; a second pulley, which is connected with the driving motor via a second transmission belt and has an outer diameter different from that of the first pulley; and a clutch mechanism part, configured to switch a driving form of the driving part between a first driving form and a second driving form. The first driving form refers to a following form in which the second rotating shaft is connected with the second pulley in a manner that a rotation of the second pulley is enabled to be transferred to the second rotating shaft, so that the drum and the rotating body rotate at different speeds along with a rotation of the driving motor; and a second driving form refers to a following form in which the second rotating shaft is disconnected with the second pulley in a manner that the rotation of the second pulley is enabled to be not transferred to the second rotating shaft, so that, along with the rotation of the driving motor, the drum rotates and the rotating body becomes a free rotation state.

According to the above structure, the drum and the rotating body are different in terms of rotating speeds by employing a simple structure configured with a retarder including transmission belts and pulleys. Compared with employing a retarder consisted of the gears, the reliability of the driving part is improved in the terms of fault and the like. Additionally, since one driving motor is used for enabling the drum and the rotating body to rotate, the driving part is configured at a low cost.

Further, according to the above structure, during spinning, the rotating body becomes a free rotation state and is not rotated by the driving motor when the driving form is switched to a drum independent driving form. Therefore, washings attached to the inner circumference of the drum are not actively stirred by the rotating body, thereby spinning the washings well.

In the drum washing machine in the present manner, a structure that the second rotating shaft is surrounded by the first rotating shaft and rotates coaxially with the first rotating shaft is adopted. In addition, the following structure can be adopted: the first pulley and the second pulley are arranged to be parallel in an axial direction of the first rotating shaft and the second rotating shaft. In this case, the clutch mechanism part includes: a clutch part, which is arranged between the first pulley and the second pulley, is capable of moving along the axial direction relative to other rotating shaft and capable of rotating together with the other rotating shaft; and a shift mechanism part, configured to enable the clutch part to move along the axial direction. An engaging part is provided at a side adjacent to the second pulley of the clutch part, and an engaged part is provided at the second pulley. In the first driving form, the drum washing machine is in a following state: the clutch part is moved to the side adjacent to the second pulley by the shift mechanism part, so that the engaging part is engaged with the engaged part, and the rotation of the second pulley is transferred to the second rotating shaft via the clutch part. In the second driving form, the drum washing machine is in a following state: the clutch part is moved to a side adjacent to the first pulley by the shift mechanism part, so that the engaging part is disengaged from the engaged part, and the rotation of the second pulley is not transferred to the second rotating shaft.

According to the above structure, under the condition that the driving part adopts the structure configured with a retarder including transmission belts and pulleys, the clutch mechanism part, which can well switch the driving form of the driving part between the first driving form and the second driving form, can be realized by the clutch part arranged between the first pulley and the second pulley, and the shift mechanism part configured to enable the clutch part to move.

Further, under the condition that the above structure is adopted, the following structure can be adopted: the clutch mechanism part includes an encircling part that encircles the clutch part with the clutch part being rotatable. In this case, the shift mechanism part is connected with the encircling part.

According to such structure, since the non-rotatable encircling part is arranged, and the shift mechanism part is connected with the encircling part, the non-rotatable shift mechanism part is used to enable the rotating clutch part to move along the axial direction.

Further, under the condition that the above structure is adopted, the following structure can be adopted: the driving part is provided with a bearing part for rotatably supporting the first rotating shaft, where the first pulley is located in front of the first pulley and the second pulley and the bearing part is located in front of the first pulley. In this case, a recess configured to contain at least a part of the bearing part is formed at a side adjacent to the bearing part of the first pulley.

According to such structure, the bearing part is overlapped with the first pulley along a front-to-back direction of the driving part, the dimension in the front-to-back direction of the driving part can be decreased. Therefore, the outer tank and the drum can be enlarged in the front-to-back direction, and the washing capacity can be increased.

In the drum washing machine in the present manner, a structure that the second pulley is rotatably supported by the second rotating shaft, can be adopted.

The second pulley can also rotate along with the rotation of the driving motor even though the second pulley is not connected with the second rotating shaft. In order to realize the rotation, the second rotating shaft is also used as a supporting shaft for rotatably supporting the second pulley. Therefore, it is not necessary to arrange an additional supporting shaft, thus the cost can be reduced. Moreover, it is not necessary to perform an axis alignment with the second rotating shaft required under the condition that the supporting shaft is arranged, so that the assembling operation of the driving part becomes easy.

Effects of the Disclosure

According to the present disclosure, a drum washing machine capable of rotating the drum and the rotating body by a driving part with low cost and high reliability, is provided.

The effects and the significance of the present disclosure may be further defined through the description of embodiments shown below. However, the embodiments below are only an example for implementing the present disclosure, and the present disclosure is not limited by a technical solution described by the embodiments below.

BRIEF DESCRIPTION OF DRAWINGS

FIG. 4(*a*) is a diagram illustrating a structure of a second pulley of embodiments of the present invention;

FIG. 4(*b*) is a diagram illustrating a structure of a first pulley of embodiments of the present invention;

FIG. 5(*a*) is a diagram illustrating a structure of a clutch body of embodiments of the present invention;

FIG. 5(*b*) is a diagram illustrating a structure of a clutch guider of embodiments of the present invention;

FIG. 5(*c*) is a diagram illustrating a structure of a clutch guider of embodiments of the present invention;

FIG. 6(*a*) is a diagram illustrating a structure of a clutch part forming the clutch body of embodiments of the present invention; and FIG. 6(*b*) is a diagram illustrating a structure of a clutch part forming the clutch body of embodiments of the present invention.

DETAILED DESCRIPTION

A drum washing machine having no drying function as an embodiment of a drum washing machine of the present disclosure is described below with reference to the drawings.

Figure 1:
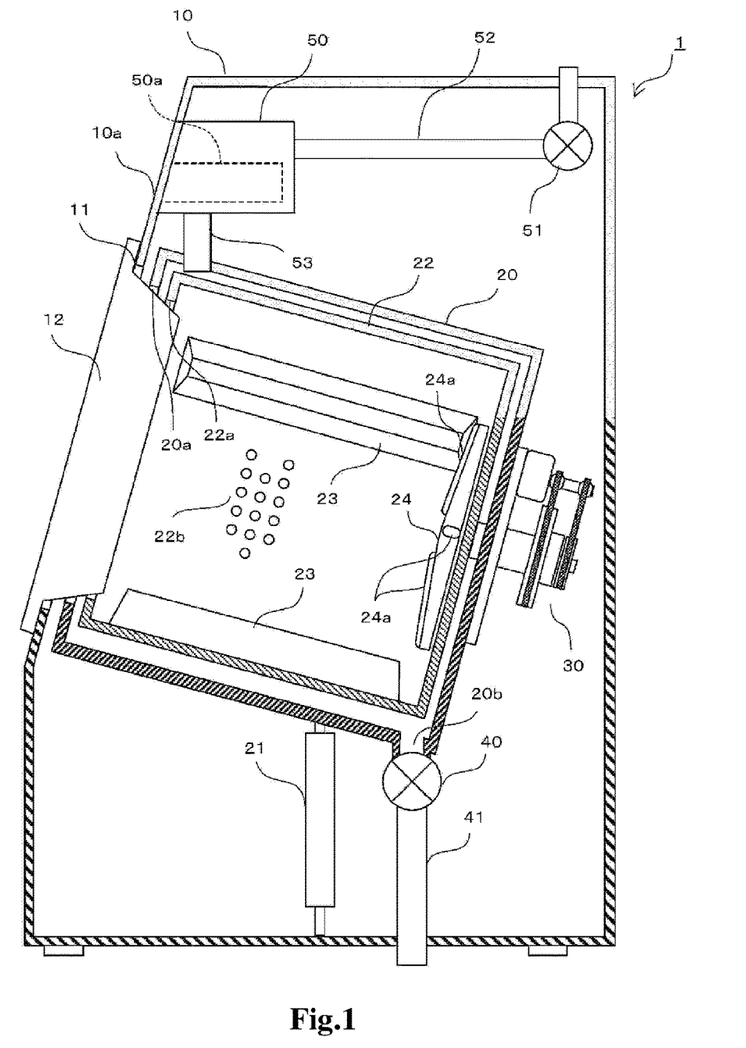
FIG. 1 is a side sectional view illustrating a structure of a drum washing machine of embodiments of the present invention.

FIG. 1 is a side sectional view illustrating a structure of a drum washing machine 1.

The drum washing machine 1 is provided with a housing 10 forming an appearance. A front surface 10*a* of the housing 10 is inclined from central part to upper part, and a throwing inlet 11 for washings is formed on the inclined surface. The throwing inlet 11 is covered by a freely opened/closed door 12.

An outer tank 20 is elastically supported within the housing 10 by a plurality of shock absorbers 21. A drum 22 is configured in the outer tank 20 with the drum 22 being rotatable. The outer tank 20 and the drum 22 incline with rear surface sides thereof being lower with respect to a horizontal direction. Therefore, the drum 22 rotates around an inclined shaft inclining with respect to the horizontal direction. Inclinations of the outer tank 20 and the drum 22 are set as about 10-20 degrees. An opening part 20*a* of a front surface of the outer tank 20 and an opening part 22*a* of a front surface of the drum 22 are opposite to the throwing inlet 11, and, together with the throwing inlet 11, are closed by the door 12. A plurality of spinning holes 22b are formed in a circumferential wall of the drum 22. In addition, three baffles 23 are arranged on the inner circumferential surface of the drum 22 along a circumferential direction at approximately equal intervals.

A rotating body 24 is configured at a rear part of the drum 22 with the rotating body being rotatable, and is in an approximate disc shape. A plurality of protruding parts 24a radially extending from a central part of the rotating body 24 are formed on the surface of the rotating body 24. The rotating body 24 and the drum 22 coaxially rotate.

A driving part 30 generating a torque for driving the drum 22 and the rotating body 24 is configured behind the outer tank 20. The driving part 30 enables the drum 22 and the rotating body 24 to rotate in a same direction at different rotating speeds during a washing process and a rinsing process.

Specifically, the driving part 30 enables the drum 22 to rotate at a rotating speed so that a centrifugal force exerted on the washings in the drum 22 is less than the gravity, and enables the rotating body 24 to rotate at a rotating speed greater than that of the drum 22.

On the other hand, during a spinning process, the driving part 30 enables the drum 22 to rotate at a rotating speed so that the centrifugal force exerted on the washings in the drum 22 is far more than the gravity, and enables the rotating body 24 to be in a free rotation state without rotating. A detailed structure of the driving part 30 is described later.

A drainage outlet 20b is formed at a bottom of the outer tank 20. A drainage valve 40 is arranged at the drainage outlet 20b and is connected with a drainage hose 41. Water stored in the outer tank 20 is drained off through the drainage hose 41 when the drainage valve 40 is opened.

A detergent box 50 is configured at the front upper part in the housing 10. A detergent container 50a containing a detergent, which can be freely drawn out from the front of the detergent box 50, is contained in the detergent box 50. The detergent box 50 is connected with a water feeding valve 51 provided at the rear upper part in the housing 10 through a water feeding hose 52. In addition, the detergent box 50 is connected with the upper part of the outer tank 20 through a water injecting hose 53. Tap water from a faucet is supplied into the outer tank 20 through the water feeding hose 52, the detergent box 50 and the water injecting hose 53 when the water feeding valve 51 is opened. At this moment, the detergent contained in the detergent container 50a is supplied into the outer tank 20 along with a water flow.

Next, a structure of the driving part 30 is described in details.

Figure 2:
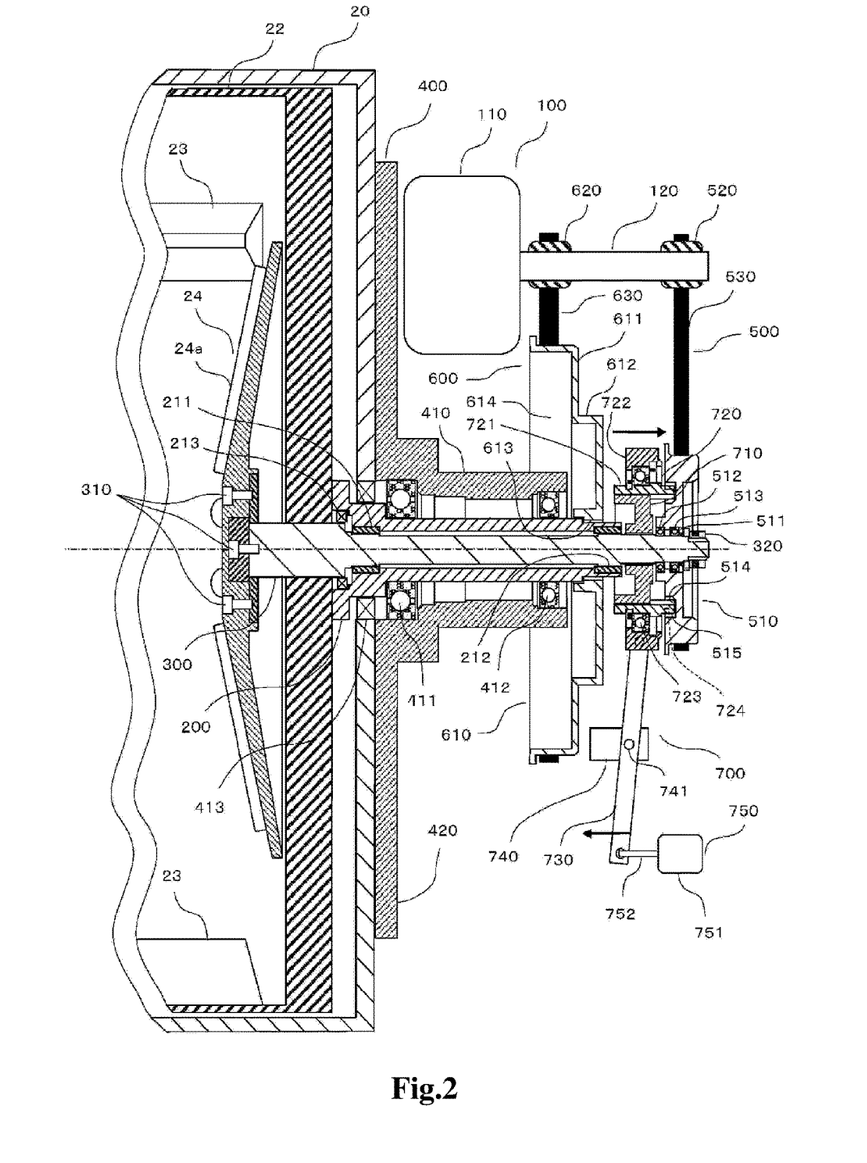
FIG. 2 is a sectional view illustrating a structure of a driving part of embodiments of the present invention.
Figure 3:
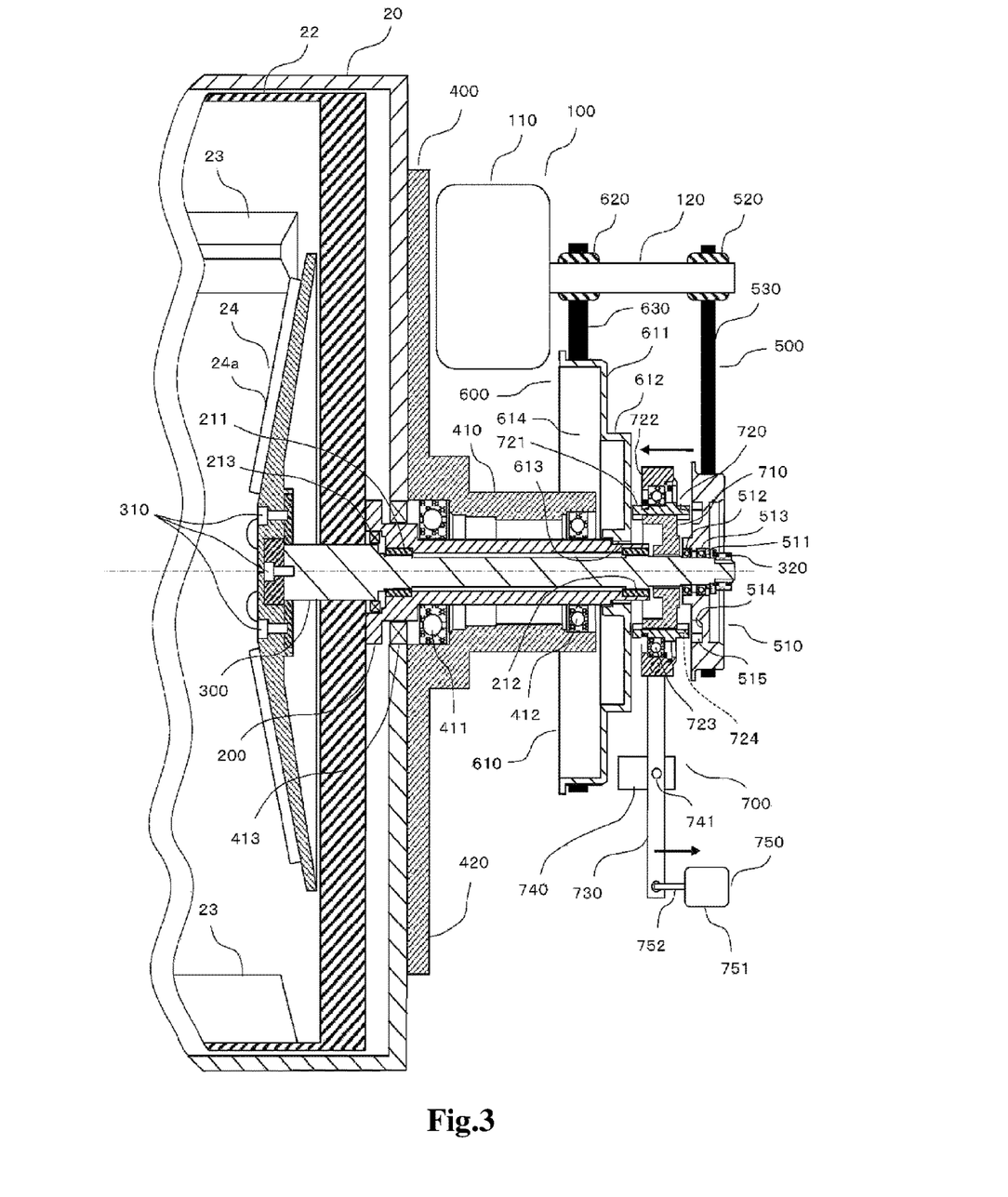
FIG. 3 is a sectional view illustrating a structure of a driving part of embodiments of the present invention.
Figure 4A:
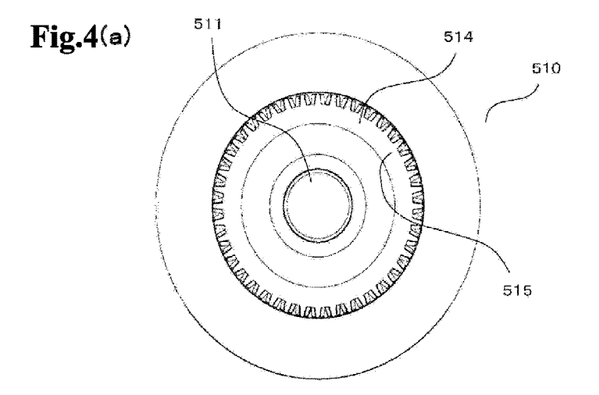
Figure 4B:
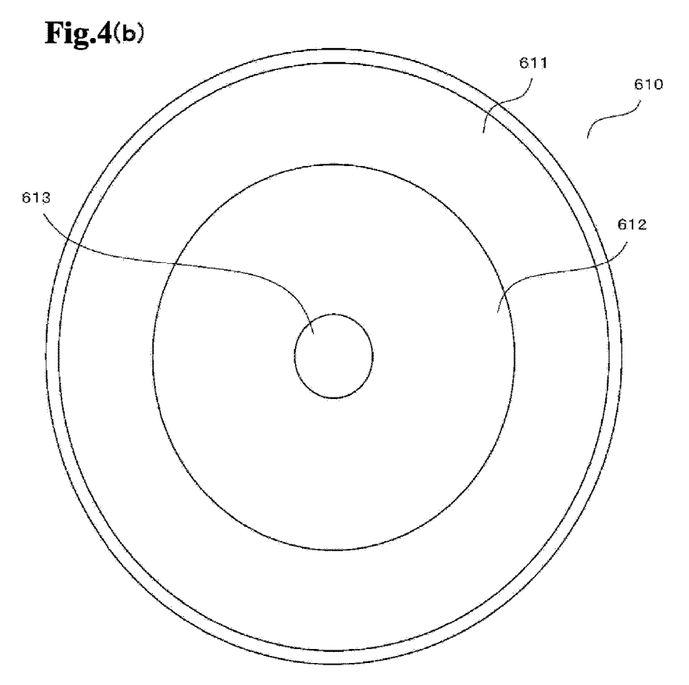
Figure 5A:
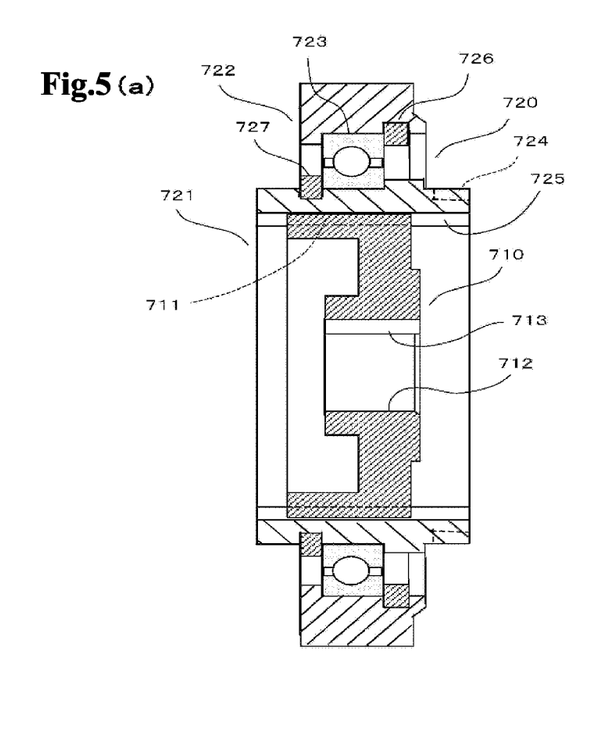
Figure 5B:
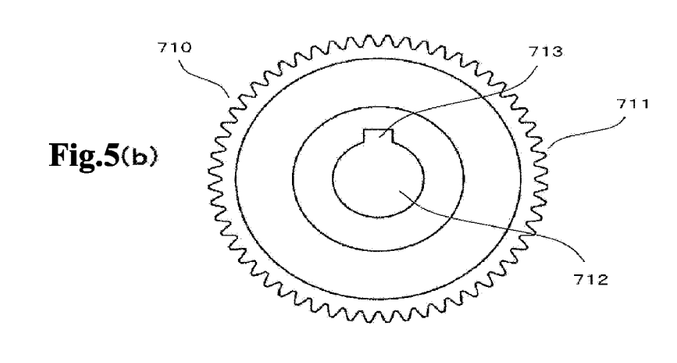
Figure 5C:
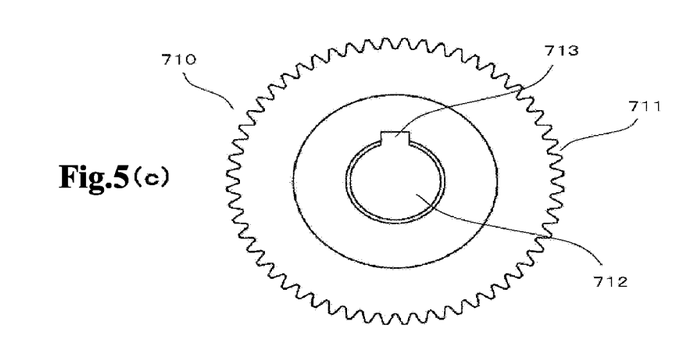
Figure 6A:
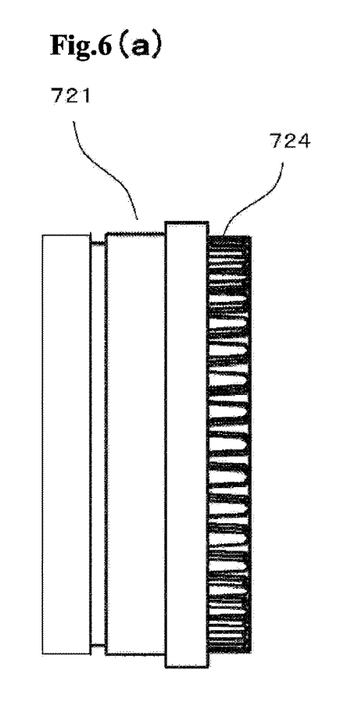
Figure 6B:
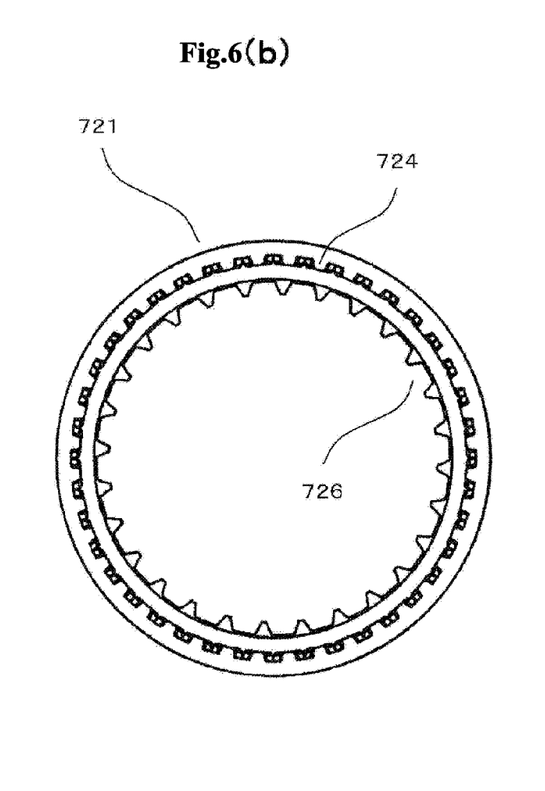

FIG. 2 and FIG. 3 are sectional views illustrating the structure of the driving part 30. FIG. 2 illustrates a state that a driving form of the driving part 30 is switched to a biaxial driving form, and FIG. 3 illustrates a state that the driving form of the driving part 30 is switched to a drum independent driving form. FIGS. 4(a)-(b) are diagrams illustrating a structure of a second pulley 510 and a structure of a first pulley 610. FIG. 4(a) is a view of the second pulley 510 viewed from the front, and FIG. 4(b) is a view of the first pulley 610 viewed from the rear. FIGS. 5(a)-(c) are diagrams illustrating a structure of a clutch guider 710 and a structure of a clutch body 720. FIG. 5(a) is a side sectional view illustrating the clutch guider 710 and the clutch body 720, FIG. 5(b) is a view of the clutch guider 710 viewed from the front, and FIG. 5(c) is a view of the clutch guider 710 viewed from the rear. FIGS. 6(a)-(b) are diagrams illustrating a structure of a clutch part 721 forming the clutch body 720. FIG. 6(a) is a side view illustrating the clutch part 721, and FIG. 6(b) is a view of the clutch part 721 viewed from the rear.

The driving part 30 includes: a driving motor 100, a first rotating shaft 200, a second rotating shaft 300, a bearing unit 400, a wing retarder 500, a drum retarder 600 and a clutch mechanism part 700.

The driving motor 100 generates the torque for driving the drum 22 and the rotating body 24. For example, the driving motor 100 is a DC (Direct Current) brushless motor of outer rotor type, and a motor shaft 120 connected with a rotor in the housing 10 extends backward from the housing 10.

The first rotating shaft 200 is in a hollow shape. A front part and rear part of an inner side of the first rotating shaft 200 are provided with a first sliding bearing 211 and a second sliding bearing 212 respectively, and a front end of the first rotating shaft 200 is provided with a mechanical sealing member 213.

The second rotating shaft 300 is surrounded by the first rotating shaft 200. A front part of the second rotating shaft 300 protrudes forward from the first rotating shaft 200, and a rear part of the second rotating shaft 300 protrudes backward from the first rotating shaft 200. An outer circumferential surface of the second rotating shaft 300 is supported by the first sliding bearing 211 and the second sliding bearing 212, and the second rotating shaft 300 rotates within the first rotating shaft 200 smoothly. In addition, the mechanical sealing member 213 can prevent water from invading into a space between the second rotating shaft 300 and the first rotating shaft 200.

An approximate cylindrical bearing part 410 is configured at a central part of the bearing unit 400. A first rolling bearing 411 and a second rolling bearing 412 are respectively arranged at a front part and rear part of an inner side of the bearing part 410, and a mechanical sealing member 413 is arranged at a front end of the bearing part 410. An outer circumferential surface of the first rotating shaft 200 is supported by the first rolling bearing 411 and the second rolling bearing 412, and the first rotating shaft 200 rotates in the bearing part 410 smoothly. In addition, the mechanical sealing member 413 can prevent water from invading into the space between the first rotating shaft 200 and the bearing part 410. Further, in the bearing unit 400, a fixed flange 420 is formed at a periphery of the bearing part 410.

At the fixed flange 420, the bearing unit 400 is fixed on the rear surface of the outer tank 20 by a fastening manner of a tightening screw and the like. In a state that the bearing unit 400 is mounted on the outer tank 20, the second rotating shaft 300 and the first rotating shaft 200 enter into the outer tank 20. The drum 22 is fixed on the first rotating shaft 200 via a screw not shown in the diagram, and the rotating body 24 is fixed on the second rotating shaft 300 via a screw 310.

The wing retarder 500 includes: a second pulley 510, a second motor pulley 520 and a second transmission belt 530. The rotation of the driving motor 100 is decelerated according to a reduction ratio determined by an outer diameter ratio between the second pulley 510 and the second motor pulley 520, and is transferred to the second rotating shaft 300.

The second pulley 510 is rotatably supported by the rear end of the second rotating shaft 300. An insertion hole 511, in which the second rotating shaft 300 is inserted, is formed in the central part of the second pulley 510, and a rolling bearing 512 and a rolling bearing 513, which are arranged front and back, are clamped between the insertion hole 511 and the second rotating shaft 300. The second pulley 510 smoothly rotates relative to the second rotating shaft 300 by the two rolling bearings 512 and 513.

As shown in FIG. 4(a), an annular engaged recess 514 is formed on the front surface of the second pulley 510. A rack 515 is formed on an outer circumferential surface of the engaged recess 514 throughout the circumference. The rack 515 is equivalent to the engaged part of the present disclosure. The second pulley 510 can be prevented from falling off backward by a fastening screw 320 mounted at the rear end of the second rotating shaft 300.

The second motor pulley 520 is mounted at the front end of the motor shaft 120 of the driving motor 100. The second transmission belt 530 is erected between the second pulley 510 and the second motor pulley 520.

The drum retarder 600 includes: a first pulley 610, a first motor pulley 620 and a first transmission belt 630. The rotation of the driving motor 100 is decelerated according to a reduction ratio determined by an outer diameter ratio between the first pulley 610 to the first motor pulley 620, and is transferred to the first rotating shaft 200.

The first pulley 610 is in a disc shape with the front surface being opened and includes: a pulley part 611 and a fixing part 612 with an outer diameter less than that of the pulley part 611. Since the outer diameter of the pulley part 611, i.e. the outer diameter of the first pulley 610, is greater than that of the second pulley 510, a reduction ratio generated by the drum retarder 600 is much greater than that generated by the wing retarder 500.

An insertion hole 613 is formed at the central part of the fixing part 612. The rear end of the first rotating shaft 200 is inserted into the insertion hole 613, and is fixed into the insertion hole 613 by a specified fastening method of pressing the rack and the like. Therefore, the first pulley 610 is fixed at the rear end of the first rotating shaft 200.

The rear end of the bearing part 410 is contained in a recess 614 sunken backward, i.e., the inner of the pulley part 611. Therefore, the bearing unit 400 is overlapped with the first pulley 610 in a front-and-back direction of the driving part 30.

The first motor pulley 620 is mounted at a root of the motor shaft 120 of the driving motor 100. The first transmission belt 630 is erected between the first pulley 610 and the first motor pulley 620.

The clutch mechanism part 700 switches between the biaxial driving form and the drum independent driving form controlled by the driving part 30. The biaxial driving form means a form in which the second rotating shaft 300 is connected with the second pulley 510 in a manner that the rotation of the second pulley 510 can be transferred to the second rotating shaft 300, so that the drum 22 and the rotating body 24 rotate at different rotating speeds along with the rotation of the driving motor 100. The drum independent driving form means a form in which the connection of the second rotating shaft 300 and the second pulley 510 is released in a manner that the rotation of the second pulley 510 is not transferred to the second rotating shaft 300, so that, along with the rotation of the driving motor 100, the rotating body 24 is in a free rotation state while the drum 22 rotates. The biaxial driving form is equivalent to a first driving form of the present disclosure, and the drum independent driving form is equivalent to a second driving form of the present disclosure.

The clutch mechanism part 700 includes: the clutch guider 710, the clutch body 720, a clutch lever 730, a lever supporting part 740 and a clutch driving apparatus 750.

The clutch guider 710 and the clutch body 720 are configured in an axial direction of the first rotating shaft 200 and the second rotating shaft 300, and are configured between the first pulley 610 and the second pulley 510.

As shown in FIGS. 5(a)-(c), the clutch guider 710 is in a cylindrical shape with the front surface thereof being opened. A rack 711 is formed on an outer circumferential surface of the clutch guider 710 throughout the circumference. An insertion hole 712 is formed at a central part of the clutch guider 710. A wedge groove 713 is formed in the insertion hole 712. The second rotating shaft 300 penetrates through the insertion hole 712 of the clutch guider 710, and the clutch guider 710 is fixed on the second rotating shaft 300 by a fixing manner employing the wedge groove 713 and a wedge not shown in the diagram. Therefore, the clutch guider 710 rotates together with the second rotating shaft 300.

As shown in FIG. 5(a), the clutch body 720 includes the clutch part 721, an encircling part 722 and a rolling bearing 723. The clutch part 721 is in a cylindrical shape with the front surface and the rear surface thereof being opened. As shown in FIGS. 6(a)-(b), a rear rack 724 is formed at the rear of an outer circumferential surface of the clutch part 721 throughout the whole circumference. The rear rack 724 is equivalent to an engaging part of the present disclosure.

An inner diameter of the clutch part 721 is approximately equal to an outer diameter of the clutch guider 710, and a front-to-back dimension of the clutch part 721 is much greater than that of the clutch guider 710. The clutch guider 710 is inserted into the clutch part 721. An inner rack 725 is formed on the inner circumferential surface of the clutch part 721 throughout the circumference, and is engaged with the rack 711 of the clutch guider 710. A front-to-back dimension of the inner rack 725 is much greater than that of the rack 711.

Through the engagement of the inner rack 725 and the rack 711, the clutch part 721 becomes the following state: the clutch part 721 can move along the axial direction of the second rotating shaft 300 relative to the clutch guider 710, i.e. the second rotating shaft 300 where the clutch guider 710 is fixed, and can rotate together with the second rotating shaft 300.

The encircling part 722 is formed as annulus, and is configured to encircle the central part of the clutch part 721 with the clutch part 721 being rotatable. A rolling bearing 723 is arranged between the clutch part 721 and the encircling part 722. The rolling bearing 723 is fixed by two locating wheels 726 and 727 in different sizes, so as to prevent from moving front and back. The clutch part 721 smoothly rotates relative to the encircling part 722 by the rolling bearing 723.

An upper end of the clutch lever 730 is coupled to the encircling part 722 so that the clutch lever 730 can rotate with respect to the encircling part 722. In addition, the clutch lever 730 is rotatably supported by a supporting shaft 741 arranged on the lever supporting part 740.

The clutch driving apparatus 750 includes: an actuator 751 and an operating lever 752. The actuator 751 enables the operating lever 752 to move front and back. The operating lever 752 is coupled to a lower end of the clutch lever 730. The lower end of the clutch lever 730 can rotate with respect to the operating lever 752.

The lever supporting part 740 and the clutch driving apparatus 750 are fixed on a mounting plate not shown in the diagram, and the mounting plate is installed on the bearing unit 400 or the outer tank 20.

It should be noted that the clutch lever 730, the lever supporting part 740 and the clutch driving apparatus 750 form a shift mechanism part of the present disclosure.

In the case that the driving form of the driving part 30 is switched from the drum independent driving form to the biaxial driving form, as shown in FIG. 2, the operating lever 752 is pushed forward from the inside of the actuator 751. The lower end of the clutch lever 730 is pushed by the operating lever 752 to move forward, and the clutch lever 730 rotates backward about the supporting shaft 741. The upper end of the clutch lever 730 moves backward, and the clutch body 720 is pushed by the upper end of the clutch lever 730 to move backward. As a result, the rear rack 724 of the clutch part 721 is engaged with the rack 515 of the second pulley 510.

When the rear rack 724 is engaged with the rack 515, the clutch part 721 and the second pulley 510 are fixed in the rotating direction. Therefore, the drum washing machine becomes a state that the rotation of the second pulley 510 can be transferred to the second rotating shaft 300 via the clutch part 721 and the clutch guider 710. Under this state, when the driving motor 100 rotates, the rotation is transferred to the second rotating shaft 300 via the wing retarder 500, thus the rotating body 24 fixed on the second rotating shaft 300 rotates. The rotating body 24 rotates at a rotating speed decreased from the rotating speed of the driving motor 100 according to a reduction ratio generated by the wing retarder 500. In addition, the rotation of the driving motor 100 is transferred to the first rotating shaft 200 via the drum retarder 600, thus the drum 22 fixed on the first rotating shaft 200 rotates. The drum 22 rotates at a rotating speed decreased from the rotating speed of the driving motor 100 according to a reduction ratio generated by the drum retarder 600. As described above, since the reduction ratio generated by the drum retarder 600 is much greater than that of the wing retarder 500, the rotating body 24 rotates at a rotating speed greater than that of the drum 22, and rotates in a same direction as that of the drum 22.

Herein, although the clutch part 721 rotates together with the second pulley 510, since the clutch lever 730 is connected with the encircling part 722 coupled to the clutch part 721 with the clutch part being rotatable, the rotation of the clutch part 721 is hardly transferred to the clutch lever 730 even if the clutch part 721 rotates.

On the other hand, in the case that the driving form of the driving part 30 is switched from the biaxial driving form to the drum independent driving form, as shown in FIG. 3, the operating lever 752 is retracted to the inside of the actuator 751, that is, the operating lever 752 moves backward. The lower end of the clutch lever 730 is pulled by the operating lever 752 to move backward, and the clutch lever 730 rotates forward about the supporting shaft 741. The upper end of the clutch lever 730 moves forward, and the clutch body 720 is pushed by the upper end of the clutch lever 730 to move forward. As a result, the rear rack 724 of the clutch part 721 is disengaged from the rack 515 of the second pulley 510.

When the rear rack 724 is disengaged from the rack 515, the drum washing machine becomes a state that the rotation of the second pulley 510 cannot be transferred to the second rotating shaft 300. Under this state, when the driving motor 100 rotates, the rotation is transferred to the first rotating shaft 200 via the drum retarder 600 to rotate the drum 22. The drum 22 rotates at a rotating speed decreased from the rotating speed of the driving motor 100 according to the reduction ratio generated by the drum retarder 600. The drum 22 and the driving motor 100 rotate in a same direction as integration. Even if the driving motor 100 rotates, the second pulley 510 only idles with respect to the second rotating shaft 300 and the rotation of the second pulley 510 cannot be transferred to the second rotating shaft 300. Therefore, the rotating body 24 becomes a free rotation state.

The drum washing machine 1 carries out washing operation in various operation modes. The washing operation includes: a washing process, an intermediate spinning process, a rinsing process and a final spinning process.

The driving form of the driving unit 30 is switched to the biaxial driving form in the washing process and the rinsing process. Under the state that water stored in the outer tank 20 fails to reach a specified water level at the lower edge of the throwing opening 11, the driving motor 100 alternately realizes right rotation and left rotation. As a result, the drum 22 and the rotating body 24 alternately realize right rotation and left rotation with the rotating speed of the rotating body 24 being greater than that of the drum 22. At this time, the rotating speed of the drum 22 is set as a rotating speed that enables the centrifugal force acted on the washings to be less than the gravity.

When the drum 22 and the rotating body 24 rotate, the washings in the drum 22 are lifted up and dropped down by the baffles 23, so that the washings are thrown to the inner circumferential surface of the drum 22. In addition, at the rear part of the drum 22, the washings contact the protruding parts 24a of the rotating body 24 which is rotating, the washings are rubbed by the protruding parts 24a, or the washings are stirred by the protruding parts 24a. Therefore, the washings are washed and rinsed.

In this way, during washing and rinsing, not only a mechanical force generated by the rotation of the drum 22, but also a mechanical force generated by the rotating body 24, are applied to the washings, so as to expect the improvement of detergency. Then, in the intermediate spinning process and the final spinning process, the driving form of the driving part 30 is switched to the drum independent driving form. The driving motor 100 rotates at a high speed in one direction, and the drum 22 rotates at a rotating speed that enables the centrifugal force acted on the washings in the drum 22 to be far more than the gravity. The washings are thrown against the inner circumferential surface of the drum 22 by the centrifugal force to realize spinning. At this moment, the rotating body 24 is not drove by the driving motor 100 to rotate, and becomes a free rotation state.

In this way, during spinning, the rotating body 24 is not drove by the driving motor 100 to rotate, thus the washings attached to the drum 22 are well spun without being actively stirred by the rotating body 24.

Effects of the Embodiment

According to the present embodiment, the drum 22 and the rotating body 24 are different in term of rotating speed by employing a simple structure configured by a retarder consisting of the transmission belts and the pulleys. Therefore, compared with employing a retarder consisting of gears, the reliability of the driving part 30 can be improved in terms of fault and the like. Additionally, merely one driving motor 100 is used to drive the drum 22 and the rotating body 24 to rotate, thus the driving part 30 can be configured at low cost.

Further, through the above embodiment, during watering, the rotating body 24 becomes a free rotation state and cannot be rotated by the driving motor 100 when the driving form is switched to the drum independent driving form. Therefore, the washings attached to the inner circumferential surface of the drum 22 can be well spun without being actively stirred by the rotating body 24.

Further, the drum 22 and the rotating body 24 integrally rotate at the same speed during spinning, thus there needs engaging structures such as racks between the clutch part 721 and the first pulley 610 in the case that the clutch mechanism part 700 adopts a following structure, i.e., a structure in which the second rotating shaft 300 is connected to the first pulley 610 in such a manner that the rotation of the first pulley 610 can be transferred to the second rotating shaft 300. However, in the above embodiment, there is no engaging structure such as a rack between the clutch part 721 and the first pulley 610, thus the structures of the clutch part 721 and the first pulley 610 are simplified. In addition, since no engaging structure exists at the front side, the size of the clutch part 721, i.e., the size of the clutch body 720 in a front-to-back direction, can be reduced accordingly, thereby reducing the size of the driving part 30 in the front-to-back direction. Thus, the outer tank 20 and the drum 22 can be enlarged in the front-to-back direction, and the washing capacity can be increased.

Further, according to the present embodiment, in the case that the driving part 30 adopts a structure including a retarder consisting of the transmission belts and the pulleys, the clutch mechanism part 700 can be realized by the clutch body 720 arranged between the first pulley 610 and the second pulley 510 as well as the clutch lever 730 and the clutch driving apparatus 750 configured to move the clutch body 720, and the clutch mechanism part 700 can well switch the driving form of the driving part 30 between the biaxial driving form and the drum independent driving form.

Further, according to the present embodiment, the encircling part 722 is configured as encircling the clutch part 721 in a free rotation state, and is coupled to the clutch lever 730. Therefore, the rotatable clutch part 721 can move toward the axial direction of the second rotating shaft 300 by using non-rotatable shift mechanism parts.

Further, according to the present embodiment, since the bearing unit 400 is overlapped with the first pulley 610 along the front-to-back direction of the driving part 30, the dimension in the front-to-back direction of the driving part 30 can be decreased. Therefore, the outer tank 20 and the drum 22 can be enlarged in the front-to-back direction, thereby the washing capacity can be increased.

Further, according to the present embodiment, in the drum independent driving form, the supporting shaft required for the rotation of the second pulley 510, which rotatably supports the second pulley 510, is also used as the second rotating shaft 300. Therefore, no additional supporting shaft is required to be arranged, thus the cost can be reduced. Moreover, the assembling operation of the driving part 30 becomes easy because it is not necessary to perform an axis alignment with the second rotating shaft 300 required under the condition that the supporting shaft is arranged.

Although the embodiments of the present invention are described above, the present disclosure is not limited by the above embodiments. In addition, various changes can also be made to the embodiments of the present invention in addition to the above description.

For example, in the above embodiment, in the intermediate spinning process and the final spinning process, the driving form of the driving part 30 is switched to the drum independent driving form. However, a structure that the driving form is switched to the drum independent driving form when the drum 22 rotates in the washing process and the rinsing process can also be adopted. For example, the driving form is switched to the drum independent driving form in a washing mode for washing delicate clothes and clothes with drying identifiers particularly.

Under a state that water is stored in the outer tank 20, the drum 22 rotates and the washings are stirred by the baffles 23 when the driving motor 100 rotates in the drum independent driving form.

At this time, since the washings are lifted near the right upper part of the drum 22 and dropped down by the baffles 23 at the front side of the drum 22, the washings almost rotate twice during one rotation of the drum 22. On the other hand, at the rear side of the drum 22, the washings easily become a state of being pressed by the rotating body 24. As described above, since the rotating body 24 is in a free rotation state, the rotating body 24 also easily rotates together with the washings when the washings are stirred by the baffles 23 to rotate. Therefore, either at the rear side of the drum 22 or at the front side of the drum 22, the washings almost rotate twice during one rotation of the drum 22. Therefore, a rotating difference of the washings is hard to be generated between the front side and the rear side of the drum 22, thereby it is hard to generate twisting of the washings caused by the rotating difference.

It should be noted that under a situation that the rotating body 24 cannot freely rotate relative to the drum 22, when the washings are stirred by the baffles 23 after being pushed and pressed by the rotating body 24 at the rear side of the drum 22, the washings will not drop near the right upper part of the drum 22 and become a state of being attached to the rotating body 24 to rotate. In this way, at the rear side of the drum 22, since the washings almost realize only one rotation during one rotation of the drum 22, the rotating difference of the washings is generated between the front side and the rear side of the drum 22, thereby the washings are easily twisted.

In addition, as it is in the biaxial driving form, in the drum independent driving form, the rotating body 24 does not rotate by the driving motor, the washings are not be rubbed by the rotating body 24 either.

In this way, in the washing process and the rinsing process, in the case that the driving motor 100 is operated in the drum independent driving form, it is hard to generate damages caused by the twisting and the friction of the washings. Therefore, according to the modification example, delicate clothes can be washed or rinsed with the damage to the delicate clothes being inhibited.

In addition, in the above embodiment, the clutch part 721 and the second pulley 510 are fixed in the rotating direction through engagement of the rear rack 724 of the clutch part 721 and the rack 515 of the second pulley 510. However, the engagement structure of the rear part of the clutch part 721 and the second pulley 510 is not limited to the above implementation manner, and can also be other structures. For example, the following structure can be adopted: bulges are formed at the rear part of the clutch part 721, recesses or holes are formed in the second pulley 510, and the bulges are embedded into the recesses or the holes.

In addition, in the above embodiment, two rolling bearings 512 and 513 are arranged between the second pulley 510 and the second rotating shaft 300. In addition, the rolling bearing 723 is arranged between the clutch part 721 and the encircling part 722. However, the rolling bearings 512, 513 and 723 can also be replaced by sliding bearings.

Further, in the above embodiment, the drum 22 rotates about an inclination axis inclining relative to the horizontal direction. However, the drum washing machine 1 may also adopt a structure that the drum 22 rotates about the horizontal axis.

Further, although the drum washing machine 1 in the above embodiment does not have the drying function, the present disclosure can also be applied to a drum washing machine with the drying function, i.e. a drum-type drying and washing machine.

Additionally, various changes can be appropriately made to the embodiments of the present invention within the scope of the technical conception shown in the claims.

LIST OF REFERENCE NUMERALS

10: housing; 20: outer tank; 22: drum; 24: rotating body; 24a: protruding part; 30: driving part; 100: driving motor; 200: first rotating shaft; 300: second rotating shaft; 400: bearing unit; 410: bearing part; 500: wing retarder; 510: second pulley; 515: rack (engaged part); 530: second transmission belt; 600: drum retarder; 610: first pulley; 614: recess; 630: first transmission belt; 700: clutch mechanism part; 720: clutch body; 721: clutch part; 722: encircling part; 724: rear rack (engaging part); 730: clutch lever (shift mechanism part); 740: lever supporting part (shift mechanism part); 750: clutch driving apparatus (shift mechanism part).

What is claimed is:

1. A drum washing machine, comprising:
an outer tank provided in a housing;
a drum, which is provided in the outer tank and capable of rotating about one of a horizontal axis and an inclination axis inclining with respect to a horizontal direction;
a rotating body, which is provided at a rear part of the drum and a surface of which is provided with a protruding part; and
a driving part, configured to drive the drum and the rotating body to rotate,
wherein the driving part comprises:
a driving motor;
a first rotating shaft fixed to the drum;
a second rotating shaft fixed to the rotating body;
a first pulley, which is fixed on the first rotating shaft and is connected with the driving motor via a first transmission belt;
a second pulley, which is connected with the driving motor via a second transmission belt and has an outer diameter different from that of the first pulley; and
a clutch mechanism part, configured to switch a driving form of the driving part between a first driving form and a second driving form, wherein the first driving form refers to a form in which the second rotating shaft is connected with the second pulley in a manner that a rotation of the second pulley is enabled to be transferred to the second rotating shaft, so that the drum and the rotating body rotate at different speeds along with a rotation of the driving motor; and a second driving form refers to a form in which the second rotating shaft is disconnected with the second pulley in a manner that the rotation of the second pulley is enabled to be not transferred to the second rotating shaft, so that, along with the rotation of the driving motor, the drum rotates and the rotating body becomes a free rotation state.

2. The drum washing machine according to claim 1, wherein
the second rotating shaft is surrounded by the first rotating shaft, and the first rotating shaft and the second rotating shaft rotates coaxially;
the first pulley and the second pulley are arranged to be parallel in an axial direction of the first rotating shaft and the second rotating shaft;

wherein the clutch mechanism part comprises:
a clutch part, which is arranged between the first pulley and the second pulley, is capable of moving along the axial direction relative to the second rotating shaft and capable of rotating together with the second rotating shaft; and
a shift mechanism part, configured to enable the clutch part to move along the axial direction,
wherein an engaging part is provided at a side adjacent to the second pulley of the clutch part, and an engaged part is provided at the second pulley;
in the first driving form, the drum washing machine is in a following state: the clutch part is moved to the side adjacent to the second pulley by the shift mechanism part, so that the engaging part is engaged with the engaged part, and the rotation of the second pulley is transferred to the second rotating shaft via the clutch part; and
in the second driving form, the drum washing machine is in a following state: the clutch part is moved to a side adjacent to the first pulley by the shift mechanism part, so that the engaging part is disengaged from the engaged part, and the rotation of the second pulley is not transferred to the second rotating shaft.

3. The drum washing machine according to claim 2, wherein
the clutch mechanism part further comprises an encircling part that encircles the clutch part with the clutch part being rotatable; and
the shift mechanism part is connected with the encircling part.

4. The drum washing machine according to claim 3, wherein
the driving part further comprises a bearing part for rotatably supporting the first rotating shaft, wherein the first pulley is located in front of the first pulley, and the bearing part is located in front of the first pulley, and
a recess configured to contain at least a part of the bearing part is formed at a side adjacent to the bearing part of the first pulley.

5. The drum washing machine according to claim 3, wherein
the second pulley is rotatably supported by the second rotating shaft.

6. The drum washing machine according to claim 2, wherein
the driving part further comprises a bearing part for rotatably supporting the first rotating shaft, wherein the first pulley is located in front of the first pulley, and the bearing part is located in front of the first pulley, and
a recess configured to contain at least a part of the bearing part is formed at a side adjacent to the bearing part of the first pulley.

7. The drum washing machine according to claim 6, wherein
the second pulley is rotatably supported by the second rotating shaft.

8. The drum washing machine according to claim 2, wherein
the second pulley is rotatably supported by the second rotating shaft.

9. The drum washing machine according to claim 1, wherein
the second pulley is rotatably supported by the second rotating shaft.

* * * * *